July 16, 1940.   T. E. BOSWORTH   2,208,356
OPHTHALMIC LENS MOUNTING
Filed Aug. 5, 1938
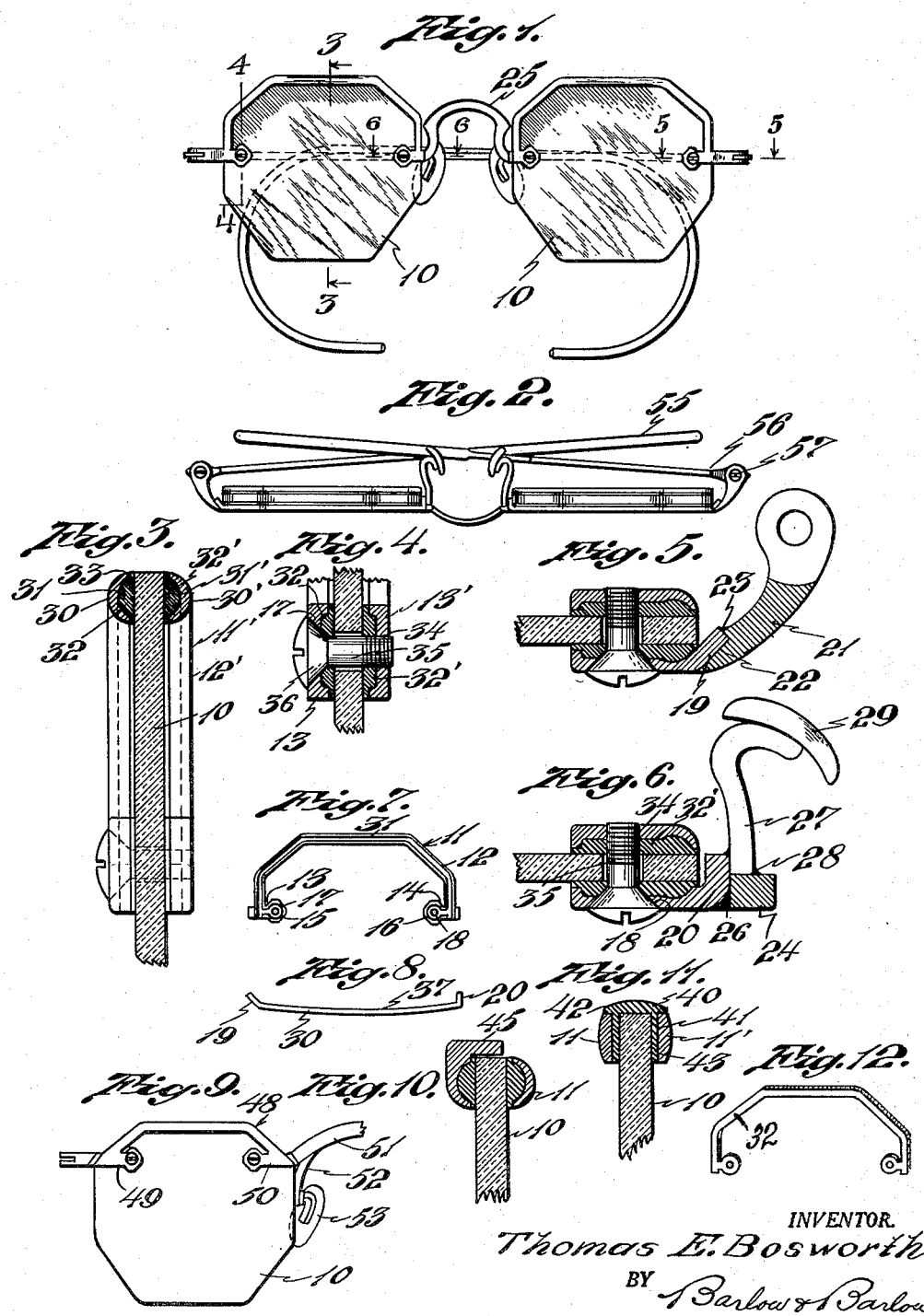
INVENTOR.
Thomas E. Bosworth
BY Barlow & Barlow
ATTORNEYS.

Patented July 16, 1940

2,208,356

UNITED STATES PATENT OFFICE 2,208,356

OPHTHALMIC LENS MOUNTING

Thomas E. Bosworth, Cranston, R. I., assignor to Universal Optical Corporation, a corporation of Rhode Island Application August 5, 1938, Serial No. 223,240

7 Claims. (Cl. 88—47)

This invention relates to an ophthalmic mounting; and has for one of its objects to provide a cushioning grip on the lens or mounting for the lens so that expansion and contraction of the parts may be accommodated and shocks exerted externally may be absorbed.

Another object of the invention is to provide a cushioning mount for the lens which will eliminate the necessity of using springs or resilient metal parts.

Another object of the invention is to provide a mounting which may be accommodated to mount a temple at any selected height on the lens.

Another object of the invention is to provide an arrangement which will be attractive in appearance and one capable of forming an ornamental mounting for the lens.

With these and other objects in view, the invention consists of certain novel features of construction, as will be more fully described, and particularly pointed out in the appended claims.

In the accompanying drawing:

Fig. 1 is a front elevational view of a spectacle;

Fig. 2 is a top plan view thereof;

Fig. 3 is a sectional view on line 3—3 of Fig. 1;

Fig. 4 is a sectional view on line 4—4 of Fig. 1;

Fig. 5 is a sectional view on line 5—5 of Fig. 1;

Fig. 6 is a sectional view on line 6—6 of Fig. 1;

Fig. 7 is a rear view of one lens mounting member;

Fig. 8 is a top edge view thereof;

Fig. 9 is a view similar to Fig. 1 showing but a single lens and of a modified form of mounting member;

Figs. 10 and 11 are sectional views showing the member engaging a fragmental portion of a lens and all of different shapes or modifications from that previously shown in the figures of the drawing;

Fig. 12 is a perspective view of the cushioning material alone.

In the mounting of eyeglass lenses or spectacles without rims spring straps are sometimes used for this purpose. Spring straps provide certain difficulties which are desirable to be avoided by simplifying the mounting; and in order to accomplish such result, I have provided a mounting in which no springs are used but rather one in which there is provided a sufficient amount and extent of cushioning material, such for instance as rubber, to enable the lens to be satisfactorily mounted without the use of metal springs for this purpose; and the following is a more detailed description of the present embodiment of this invention, illustrating the preferred means by which these advantageous results may be accomplished:

With reference to the drawing, 10 designates each lens which is here shown as of octagon drop shape, although any shape lens may be utilized. In the eight-sided shape here shown I provide a member 11 which comprises a strip of material 12 cut out to follow the shape of the upper edge of the lens in connection with which it is to be used. This member is provided with arms 13 and 14 at its ends extending inwardly toward each other. These arms are enlarged as at 15, 16 and provided with openings 17, 18 for the reception of fastening means. There is also provided a flange 19 at the temple end of the member and a flange 20 at the nasal end of the member. A temple mount 21 notched as at 22 to fit the flange 19 is soldered to the flange as at 23. One leg 24 of a bridge 25 is soldered as at 26 to the flange 20 and also has a nose pad arm 27 soldered thereto as at 28, which arm carries a nose pad 29 of any suitable shape or construction, which shape or construction may be varied as desired.

The outer face of this member 11 may be convex as at 30 or of any suitable shape which will present a satisfactory ornamental appearance, while the inner face of the member is recessed as at 31 and receives in this recess a cushioning strip of material 32 which is preferably rubber or may be cork or other similar substances which will be elastic so that when compressed it will tend to return to its previous shape. This strip of cushioning material protrudes from this recess beyond the rear surface 33 of the member 11 so that it will contact the lens 10 when placed thereagainst.

A similar member 11', comprising a similar strip of material 12' convex as at 30' and recessed on its inner surface as at 31' with cushioning material 32' therein, is located on the opposite side of the lens 10 and is also provided with arms 13' similarly constructed and shaped and provided with threaded openings 34 for the reception of a screw 35 which extends through a hole in the lens, the head 36 of which fits into the chamfered opening 17 in the arm 13 so as to bind these two members 11, 11' together each with its cushioning material against the lens. This cushioning material, as will be noted from Fig. 4, extends about the screw 35 and forms a cushion for the same and as compressed tightly grips the screw to prevent it from being withdrawn from position. This same binding screw arrangement occurs at the nasal end of the member as at the temple end, and I have caused similar figures to designate the corresponding parts in this location.

I have found that in forcing the members 11, 11' together at their ends through means of the arms 13 and 14 that it is desirable to arc the member 11 slightly before such binding is had, as illustrated in Fig. 8, where there is a slight curvature of the member as a whole, as designated at 37.

The shape of the cushioning member 32 while it will always conform to the recess 31 may be such as to permit the edges of the metal strip 11 to almost contact the lens when bound thereagainst or it may have projections thereon so that such edges will never come in contact with the lens, as I have illustrated in the showing in the drawing.

In other cases this resilient cushioning material may take the form of a cap 40, as illustrated in Fig. 11, to fit over the edge of the lens 10 and the members 11 and 11' may consist of strips of material with unrecessed or plain surfaces 41 to engage beneath the flanges 42 of the cap 40 and force the leg portions 43 of the cap into engagement with the lens 10. In this case inasmuch as the cap on the edge of the lens is self-sustaining in location, no recesses are needed in the members 11 for positioning the cushioning means with reference to the members.

In Fig. 10 I have illustrated the member 11 as provided with a lip 45 extending rearwardly from the edge of the front member to cover the upper edge of the lens 10 and provide a finished metallic surface about the edge of the lens where such might be desired, the structure being otherwise as previously shown in Figs. 1 to 6. This flange 45 will extend throughout the length of the member 11.

In Fig. 9 I have illustrated a mounting member 48 which differs from the member 11 in that it is of a shorter extent and the arms 49 and 50 are located at a higher position with reference to the lens 10 than heretofore indicated. In this instance, the bridge 51 will be equipped with an arm 52 for mounting the nose pad 53 which extends downwardly from the bridge to a position substantially upon the line of optical centers for the positioning of the nose pad in desired position. In some cases the temple mount of Fig. 9 and the bridge mount of Fig. 1 may be employed.

The temples 55 are provided with hinge mounting portions 56 to be positioned between the bifurcated ends of arm 21 and by means of some pivotal member 57 held in a hinged relation thereon.

The mounting above employed thus provides a cushioning material extending throughout a considerable length and presenting a sufficient area so that the desired amount of cushion is provided. This cushion serves not only as a shock absorber but also serves as a means for conforming to the shape of the lens to provide a well holding mounting therefor, and while for this latter purpose an elastic material is provided I might also employ some material which would conform on pressure to the shape of the lens without having elasticity as an inherent property thereof, such for instance as putty.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In an ophthalmic mounting, a lens, a pair of members each comprising a strip of material shaped to substantially follow the contour of the lens and located along the upper portion only of the edge thereof, said members being positioned on opposite sides of the lens and opposite to each other, cushioning means located between said members and the lens, and means carried by said members located adjacent to the end portions thereof and inwardly of the inner edge thereof to urge said members toward said lens to compress said cushioning means.

2. In an ophthalmic mounting, a lens, a member comprising a strip of material shaped to substantially follow the contour of the lens and located along the upper portion only of the edge thereof on one side of the lens, a similar individual member on the other side of the lens, cushioning means located between each of said members and the lens, and means positioned a substantial distance inwardly of the inner edges of said members to bind them together with said lens between them.

3. In an ophthalmic mounting, a lens, a pair of members each comprising a strip of material having a recess therein and shaped to substantially follow the contour of the lens and located along a portion of the edge thereof, said members being positioned on opposite sides of the lens and opposite to each other, cushioning means located in said recesses and normally protruding beyond the recesses to contact said lens, and means positioned a substantial distance inwardly of the inner edges of said members to urge them toward said lens and compress said cushioning means.

4. In an ophthalmic mounting, a lens, a pair of members each comprising a strip of material having a recess therein and shaped to substantially follow the contour of the lens and located along a portion of the edge thereof, said members being positioned on opposite sides of the lens and opposite to each other, cushioning means located in said recess and normally protruding beyond the recess to contact said lens, and means extending inwardly of the inner edge of the members to urge them toward said lens and compress said cushioning means, said recess extending substantially throughout the entire length of the members.

5. In an ophthalmic mounting, a lens, a pair of members each comprising a strip of material shaped to substantially follow the contour of the lens and located along the upper portion only of the edge thereof, said members being positioned on opposite sides of the lens and opposite to each other, cushioning means located between said members and the lens, and means positioned inwardly of the inner edge of the members to urge them toward said lens to compress said cushioning means, said member having a temple mount carried thereby.

6. In an ophthalmic mounting, a lens, a pair of members each comprising a strip of material shaped to substantially follow the contour of the lens and located along the upper portion only of the edge thereof, said members being positioned on opposite sides of the lens and opposite to each other, cushioning means located between said members and the lens, and means positioned inwardly of the inner edge of the members to urge them toward said lens to compress said cushioning means, said member being attached to a bridge at one end having a temple mount carried thereby at the other end.

7. In an ophthalmic mounting, a lens, a pair of members each comprising a strip of material shaped to substantially follow the contour of the lens and located along a portion of the edge thereof, said members being positioned on opposite sides of the lens and opposite to each other, cushioning means located between said member and the lens, and means positioned inwardly of the inner edge of said members to urge them toward said lens to compress said cushioning means, one of said members being flanged rearwardly at its ends and having a bridge secured to a flange at one end and a temple secured to a flange at the other.

THOMAS E. BOSWORTH.